(12) United States Patent  
Miller et al.

(10) Patent No.: US 12,492,112 B2
(45) Date of Patent: Dec. 9, 2025

(54) BEVERAGE DISPENSING APPARATUS (71) Applicant: Marmon Foodservice Technologies, Inc., Osseo, MN (US)

(72) Inventors: Mark Miller, Villa Park, IL (US); David Njaastad, Palatine, IL (US); Zachary Dresser, Batavia, IL (US); Slawomir Kielian, Des Plaines, IL (US); James Bendig, Naperville, IL (US); Steve Miller, South Elgin, IL (US); Kurt Zoellick, Oak Park, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 122 days.

(21) Appl. No.: 17/493,257

(22) Filed: Oct. 4, 2021

(65) Prior Publication Data

US 2022/0106181 A1 Apr. 7, 2022

Related U.S. Application Data (60) Provisional application No. 63/087,645, filed on Oct. 5, 2020.

(51) Int. Cl.
*B67D 1/00* (2006.01)
*B65G 17/32* (2006.01)
(Continued)

(52) U.S. Cl.
CPC ........... *B67D 1/0041* (2013.01); *B65G 17/32* (2013.01); *B65G 47/22* (2013.01); *B65G 47/44* (2013.01);
(Continued)

(58) Field of Classification Search
CPC ........ B67D 1/0041; B67D 2210/00076; B67D 2210/00078; B65G 17/32; B65G 47/22;
(Continued)

(56) References Cited

U.S. PATENT DOCUMENTS 2,227,196 A 12/1940 Nicholson
3,965,656 A * 6/1976 Gerben ................... B65B 61/28
53/329.4

(Continued)

FOREIGN PATENT DOCUMENTS

CN 109035583 12/2018
CN 109243074 1/2019
(Continued)

*Primary Examiner* — Gene O Crawford
*Assistant Examiner* — Kelvin L Randall, Jr.
(74) *Attorney, Agent, or Firm* — Andrus Intellectual Property Law, LLP (57) ABSTRACT In an automated beverage dispensing system, a conveyance system defines a plurality of cup locations and operates to sequentially move the plurality of cup locations through a plurality of indexed locations. A cup dispensing system is configured to receive a supply of cups. The cup dispensing system is operable to dispense a cup to a cup loading location that coincides with an indexed location of the plurality of indexed locations. A beverage dispensing system is configured to dispense a beverage at a beverage dispense location of the plurality of indexed locations. A computer associates an ordered beverage to a cup location of the plurality of cup locations.

12 Claims, 11 Drawing Sheets

(51) Int. Cl.
  *B65G 47/22* (2006.01)
  *B65G 47/44* (2006.01)
  *G08B 21/02* (2006.01)
  *G08B 21/22* (2006.01)
  *G08B 25/01* (2006.01)
  *G08B 25/10* (2006.01)
  *H04B 17/318* (2015.01)

(52) U.S. Cl.
  CPC ............. *G08B 21/02* (2013.01); *G08B 21/22* (2013.01); *G08B 25/016* (2013.01); *G08B 25/10* (2013.01); *H04B 17/318* (2015.01); *B67D 2210/00076* (2013.01); *B67D 2210/00078* (2013.01)

(58) Field of Classification Search
  CPC ......... B65G 47/44; G07F 11/10; G07F 11/12; G07F 11/32; G07F 13/065; G07F 13/10
  See application file for complete search history.

(56) References Cited

U.S. PATENT DOCUMENTS

| | | | |
|---|---|---|---|
| 4,195,751 A | 4/1980 | Smith | |
| 4,989,753 A | 2/1991 | Brogna et al. | |
| 5,058,630 A | 10/1991 | Wiley et al. | |
| 6,053,359 A * | 4/2000 | Goulet | B65G 47/22 |
| | | | 221/221 |
| 6,102,246 A | 8/2000 | Goulet et al. | |
| 7,669,732 B2 | 3/2010 | Njaastad | |
| 8,225,960 B2 | 7/2012 | Njaastad et al. | |
| 9,045,323 B2 | 6/2015 | Crane et al. | |
| 9,204,734 B2 | 12/2015 | Jablonski et al. | |
| 9,290,371 B2 | 3/2016 | Crane et al. | |
| 9,656,849 B2 | 5/2017 | Hawken | |
| 9,944,472 B2 | 4/2018 | Crane et al. | |
| 10,239,742 B2 | 3/2019 | Dresser et al. | |
| 10,515,327 B2 | 12/2019 | Davis | |
| 10,689,240 B1 | 6/2020 | Schultz et al. | |
| 10,689,241 B2 | 6/2020 | Dresser et al. | |
| 11,116,352 B2 * | 9/2021 | Herbert | A23G 9/12 |
| 2019/0144255 A1 * | 5/2019 | Dresser | B67D 1/0881 |
| | | | 141/94 |
| 2019/0352161 A1 * | 11/2019 | Knight | G06K 19/0723 |
| 2020/0100616 A1 * | 4/2020 | Herbert | A47J 31/41 |
| 2020/0270115 A1 * | 8/2020 | Schultz | B67D 1/0888 |
| 2020/0273283 A1 | 8/2020 | Difatta et al. | |
| 2020/0327769 A1 * | 10/2020 | Anziano | A23G 9/288 |
| 2021/0087045 A1 * | 3/2021 | Carignan | B65B 61/025 |

FOREIGN PATENT DOCUMENTS

| | | |
|---|---|---|
| EP | 0424580 | 5/1991 |
| EP | 1575006 | 9/2005 |
| GB | 788511 | 1/1958 |
| GB | 1546312 | 5/1979 |
| GB | 2247007 | 2/1992 |

\* cited by examiner

BEVERAGE DISPENSING APPARATUS

BACKGROUND

The present disclosure relates to beverage dispensing machines. More particularly, the present disclosure relates to automated beverage dispensing machines for automatically selecting and placing a cup, dispensing a beverage into the cup, and staging filled cups for delivery to a customer.

Automated beverage dispensing machines are known in the fields of fast and quick service restaurants. Automated beverage dispensing machines automate, or partially automate the act of filling cups with beverages to fulfill customer orders.

Examples of automated beverage dispensing machines are disclosed in the following patent references, which are hereby each incorporated by reference herein in their entireties:

U.S. Pat. Nos. 9,045,323; 9,290,371; 9,944,472; 10,239,742; and 10,689,241 all disclose linear configurations for transport of cups for loading, filling, and/or staging by a beverage machine.

U.S. Pat. Nos. 6,053,359; 6,102,246; and 10,689,240 disclose carousel-style configurations for transport of cups for loading, filling, and/or staging by a beverage machine.

U.S. Pat. Nos. 7,669,732; 8,225,960; 9,204,734; 9,656,849; 10,515,327; and U.S. Patent Application Publication No. 2020/0273283 all disclose other features which may be incorporated into examples of beverage dispensing machine as disclosed in further detail herein.

BRIEF DISCLOSURE

In an example of an automated beverage dispensing system having a front and a back and a first side opposite a second side, a conveyance system defines a plurality of cup locations and operates to sequentially move the plurality of cup locations through a plurality of indexed locations. A cup dispensing system is configured to receive a supply of cups. The cup dispensing system is operable to dispense a cup to a cup loading location that coincides with an indexed location of the plurality of indexed locations. A beverage dispensing system is configured to dispense a beverage at a beverage dispense location of the plurality of indexed locations. A computer associates an ordered beverage to a cup location of the plurality of cup locations. The computer maintains a record of a status of the cup location and the position of the cup location relative to the plurality of indexed locations.

In further examples of the automated beverage dispensing system, the conveyance system defines a first staging location. The plurality of indexed locations may include the first staging location. The first staging location is subsequent to the beverage dispense location within the plurality of indexed locations to which the plurality of cup locations are sequentially moved. The first staging location is offset from the beverage dispense location in a direction towards the second side of the automated beverage dispensing system and towards the front of the automated beverage dispensing system. The conveyance system includes a second staging location of the plurality of indexed locations. The second staging location is subsequent to the first staging location and offset from the first staging location in a direction towards the front of the automated beverage dispensing system. The conveyance system includes a conveyor with a plurality of cup holders, each of the cup holders defining a cup location of the plurality of cup locations.

In other examples, a chute directs a cup from the supply of cups of the cup dispensing system to the cup loading location by a gravity feed. The chute is arranged across a front of the beverage dispensing system, and the chute directs the cup across the front of the beverage dispensing system. The cup loading location is located at a first side of the beverage dispensing system. The chute is arranged parallel to the conveyance system. The chute is arranged to a side of the beverage dispensing system, and the chute directs the cups forward from the supply of cups to the cup loading location. The chute is arranged perpendicular to the conveyance system.

In still further examples, the plurality of cup locations are configured to receive a cup therein and wherein operation of the conveyance system moves the plurality of cup locations and any cup received therein sequentially through the plurality of indexed locations. The supply of cups is a first supply of cups and the cup loading location is a first cup loading location, The cup dispensing system is configured to position the first supply of cups at the first cup loading location. The indexed location is a first indexed location. A second cup loading location and the cup dispensing system is configured to position a second supply of cups at the second cup loading location, wherein the second cup loading location coincides with a second indexed location of the plurality of indexed locations. A third cup loading location and the cup dispensing system is configured to position a third supply of cups at the third cup loading location, wherein the third cup loading location coincides with a third indexed location of the plurality of indexed locations. A fourth cup loading location and the cup dispensing system is configured to position a fourth supply of cups at the fourth cup loading location. The fourth cup loading location coincides with a fourth indexed location of the plurality of indexed locations. An ice dispensing system including a hopper and a chute. The ice dispensing system configured to dispense ice into a cup at an ice dispensing location that coincides with an ice dispense location of the plurality of indexed locations. The beverage dispense location is immediately successive to the ice dispense location in the plurality of indexed locations.

Another example of an automated beverage dispensing system includes a front and a back and a first side opposite a second side. A conveyance system defines a plurality of cup locations. Each cup location includes a cup holder configured to receive a cup therein. The conveyance system operates to sequentially move the plurality of cup locations through a plurality of indexed locations. A cup dispensing system is configured to receive a first supply of cups at a first cup loading location and a second supply of cups at a second cup loading location. The first cup loading location coincides with a first indexed location of the plurality of indexed locations. The second cup loading location coincides with a second indexed location of the plurality of indexed locations. A beverage dispensing system is configured to dispense a beverage at a beverage dispense location. The plurality of indexed locations include the beverage dispense location. The plurality of indexed locations further include a first staging location. The first staging location is subsequent to the beverage dispense location within the plurality of indexed locations to which the plurality of cup locations are sequentially moved. The first staging location is offset from the beverage dispense location in a direction towards the second side of the automated beverage dispensing system and towards the front of the automated beverage dispensing system.

In further examples, the plurality of indexed locations are fixed locations and the conveyance system moves the plurality of cup locations relative to the plurality of indexed locations. The first cup loading location is vertically aligned above the first indexed location and the second cup loading location is vertically aligned above the second indexed location. The conveyance system includes a second staging location of the plurality of indexed locations. The second staging location is subsequent to the first staging location and offset from the first staging location in a direction towards the front of the automated beverage dispensing system. T cup dispensing system is further configured to receive a third supply of cups at a third cup loading location and fourth supply of cups at a fourth cup loading location. The third cup loading location coincides with a third indexed location of the plurality of indexed locations and the fourth cup loading location coincides with a fourth indexed location of the plurality of indexed locations. An ice dispensing system includes a hopper and a chute. The ice dispensing system is configured to dispense ice into a cup at a dispense location. The plurality of indexed locations includes an ice dispense location that coincides with the dispense location and the beverage dispense location is immediately successive to the ice dispense location in the plurality of indexed locations.

DETAILED DISCLOSURE

Examples of automated beverage dispensing systems are provided herein. In some examples, the beverage dispensing system provides enhanced user visual confirmation of the remaining supply of cups stored in the beverage dispensing system. Positioning of these stored cups at the exterior of the beverage dispensing system combined with transparent elements provides visual confirmation of cup supply. Location of the cup storage across the front of the beverage dispensing system further places this visual confirmation in convenient location for user observation and monitoring. In examples, sensors may be arranged relative to the cup storage for each cup type/size and the supply monitored whereby an indication of low supply, for example illumination of a light or graphical user interface icon, may be made to indicate a low supply of cups, in addition to any enhanced visual confirmation of supply as noted above.

In examples, cups may be selected and loaded using a gravity feed system, while in other examples the cups may be selected and loaded using a linear actuator system. Once a selected cup is loaded, cup positioning, filling, and/or staging systems may rely upon linear actuators, conveyors, tracks, or carousels may be used to position the cups. The cups are positioned for one or more of ice dispense, beverage dispense, labeling, and/or staging. In examples, the staging is positioned relative to the beverage dispense location such that a subsequent increment of cup positioning moves the cup from the beverage dispense to a first staging location.

Figure 10:
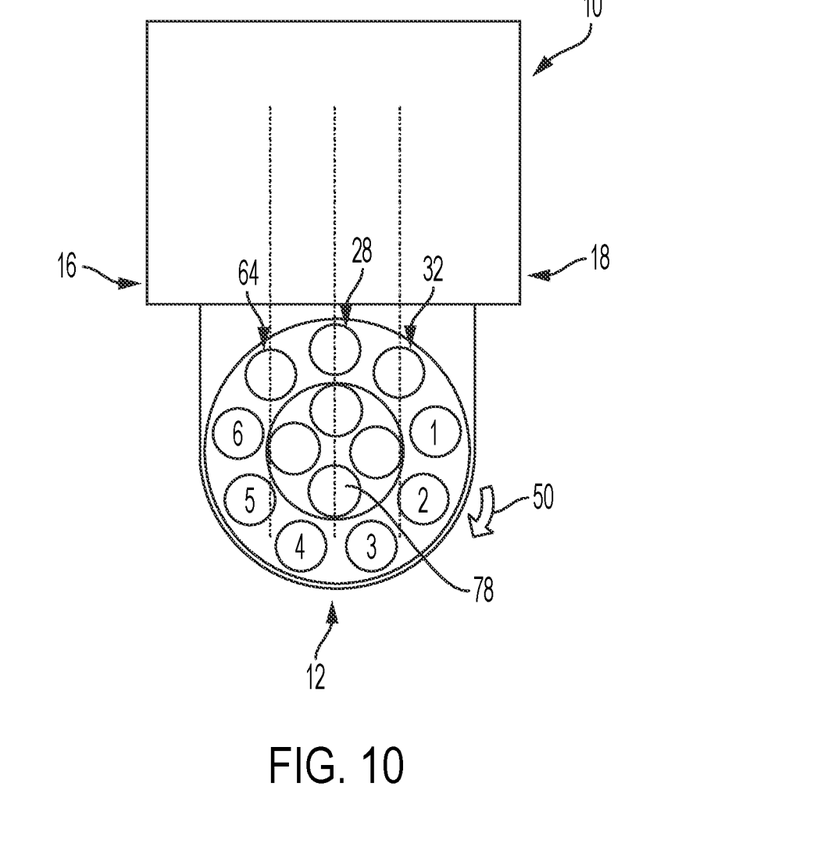
FIG. 10 is a plan view of a further example of a carousel.
Figure 11:
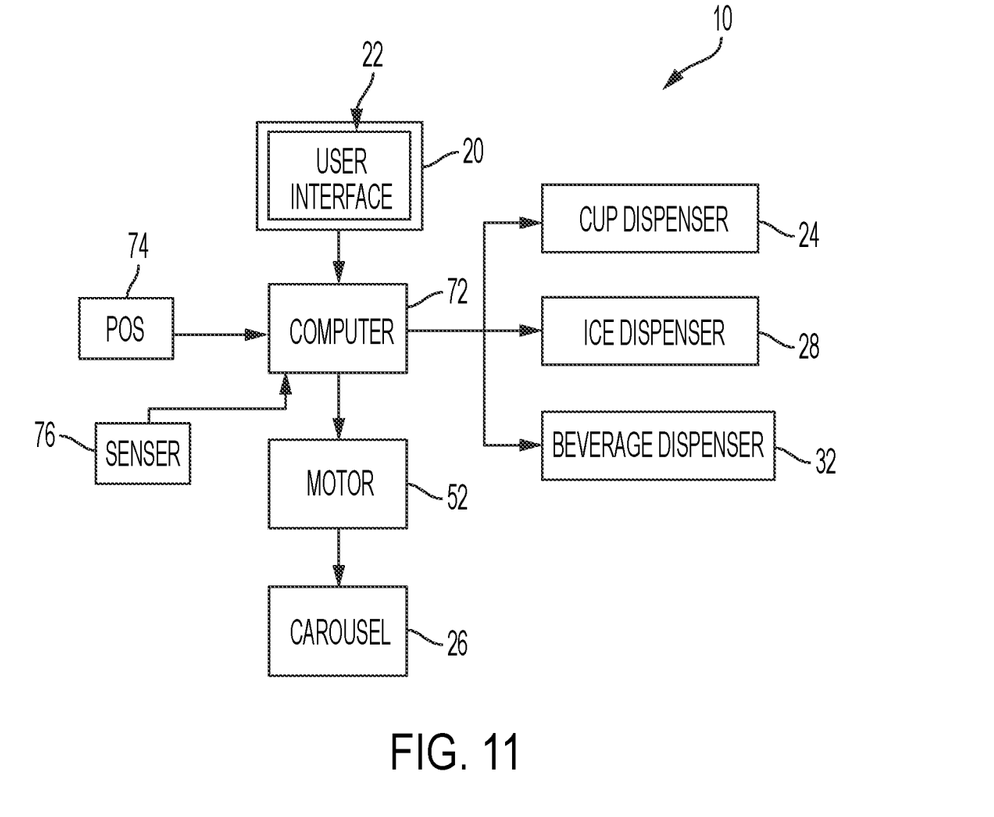
FIG. 11 is a system diagram of an example of a beverage dispensing machine.

FIGS. 1-6 and the associated description provide a detailed disclosure of an example of a beverage dispensing machine 10, the operation of which is generally described with respect to the system diagram of FIG. 11. FIGS. 7-10 provide still further examples of beverage dispensing machines 10 within the scope of the disclosure. It is recognized from the description herein that features of FIGS. 7-10 may be combined with any of the features as described elsewhere in the present disclosure to arrive at beverage dispensing machines within the scope of the disclosure.

Figure 1:
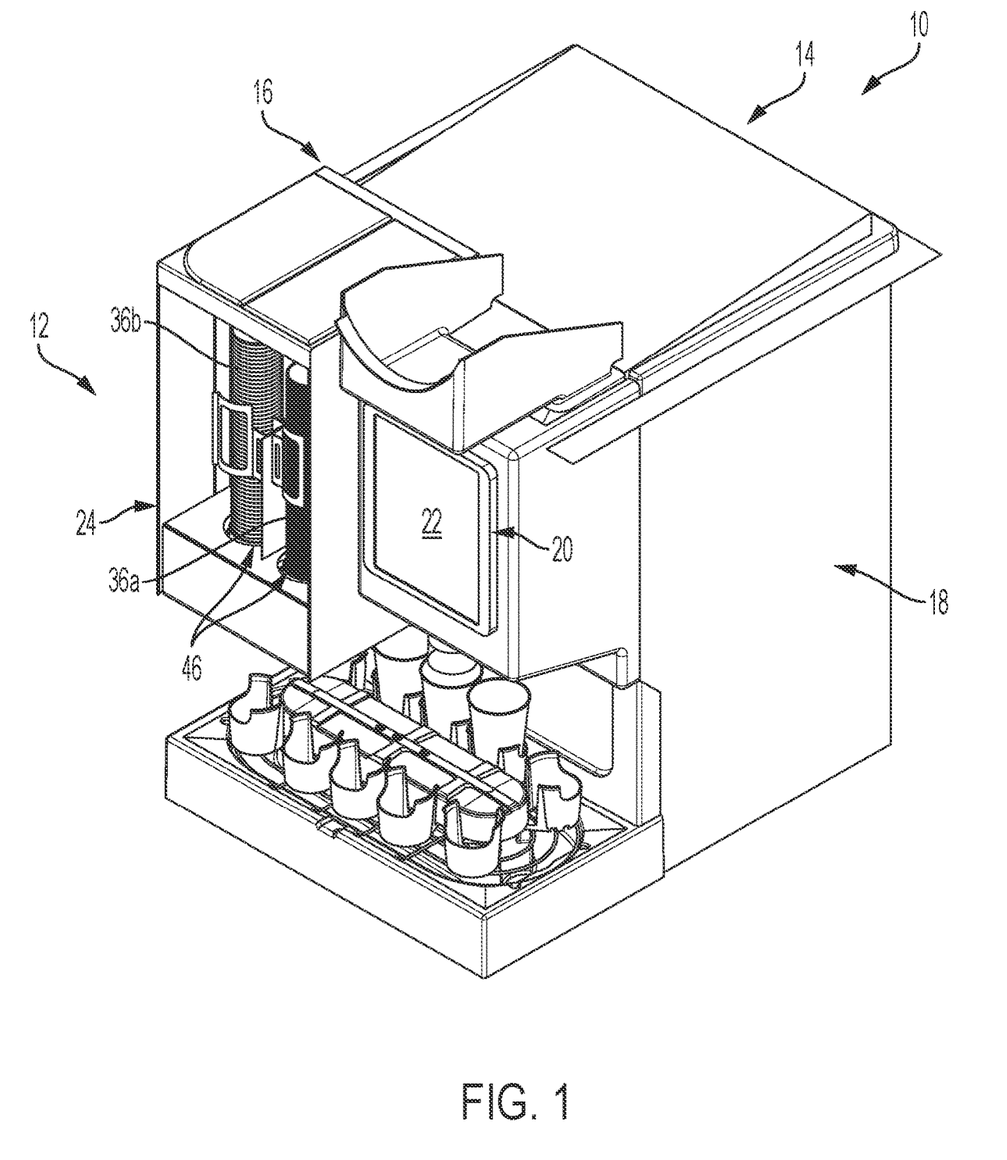
FIG. 1 is a perspective view of an example of a beverage dispensing machine.

FIG. 1 is a perspective view of an example of a beverage dispensing machine 10 which is configured as a "crew serve" dispensing machine to automatedly or semi-automatedly dispense beverages consistent with a customer's order. The beverage dispensing machine 10 is configured to provide automated cup selection, placement, ice dispensing, beverage dispensing, and staging of customer-ordered beverages in a fast or quick service restaurant setting. Automation of crew-served beverage fulfillment process as provided with the features of the disclosure herein can improve the speed of service and order completion accuracy.

The beverage dispensing machine 10 is defined by a front 12, a back 14, and sides 16, 18. Due to operation and restaurant configuration, the beverage dispensing machine 10 is both operable, observable, and configurable from the front. That is, the user interface 22, which may include a graphical display 20, the cup dispenser 24, and the cup carousel 26 are positioned at the front 12 of the beverage dispensing machine 10. As will be described in further detail herein, portions of the cup carousel 26 and the cup dispenser 24 are set forward of the user interface 22. The cup dispenser 24 further is further observable and/or accessible from the front of the beverage dispensing machine 10 to facilitate observation of present levels of the cup supplies and loading thereof.

Figure 2:
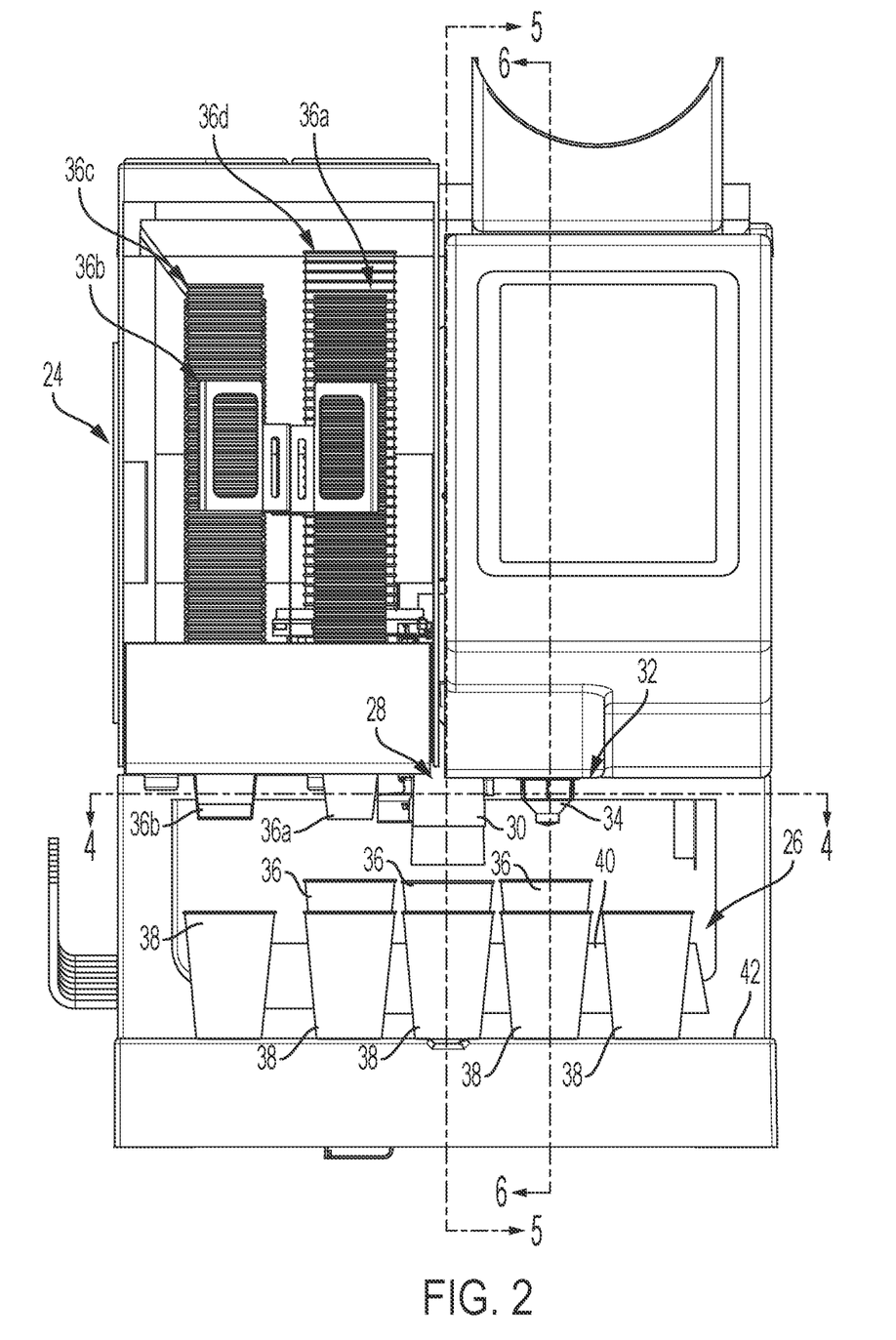
FIG. 2 is a front view of the beverage dispensing machine.
Figure 5:
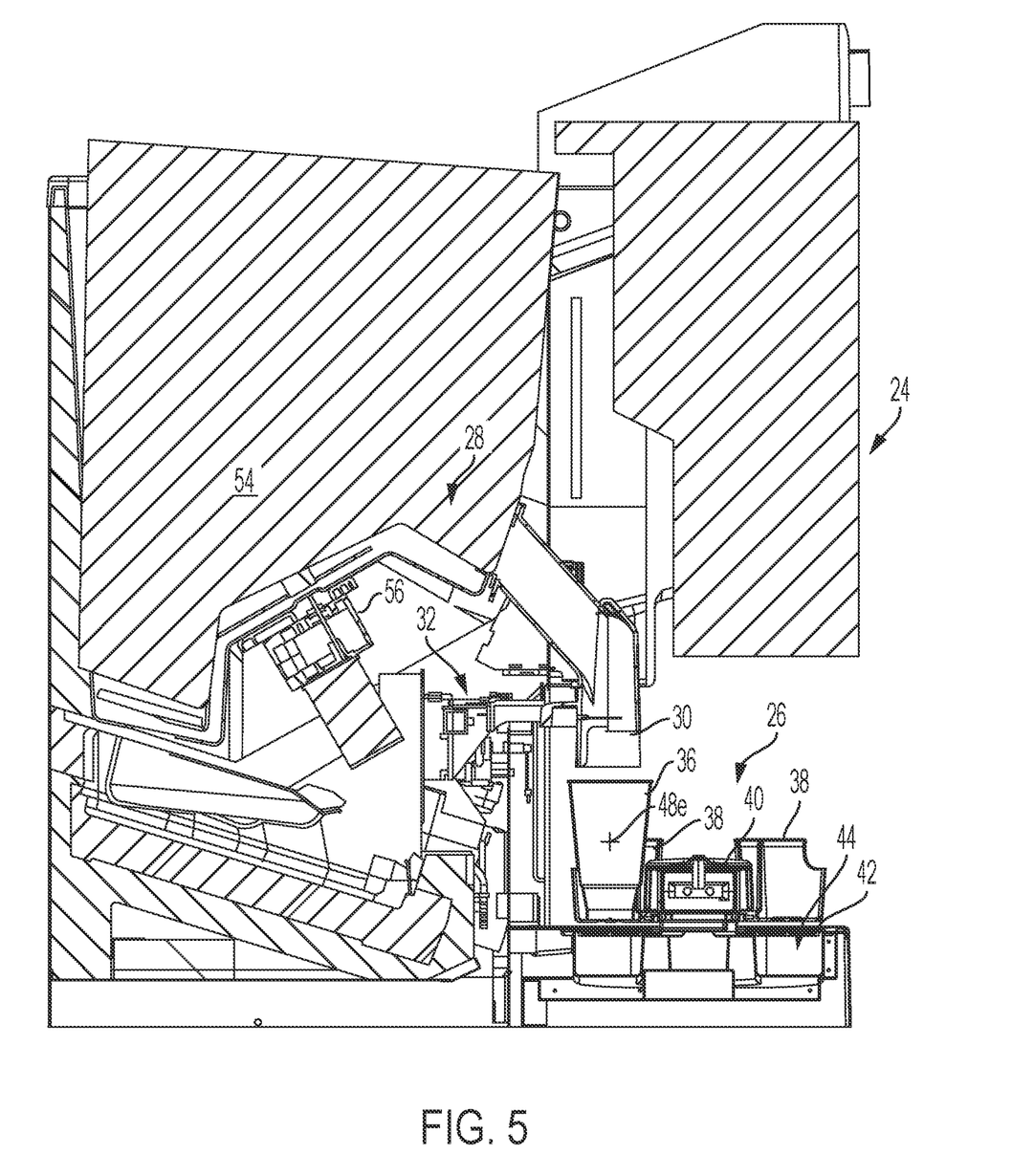
FIG. 5 is a sectional view taken along line 5-5 of FIG. 2.

FIG. 2 is a front view of the beverage dispensing machine 10. The beverage dispensing machine 10 includes an ice dispenser 28 of which an ice dispensing chute 30 is shown. The ice dispenser 28 exemplarily includes an ice bin associated with a cold plate, and may further include an auger or agitator which is operated to dispense a portion of the ice from the ice bin out through the ice dispensing chute as described herein. FIG. 5 is a cross-sectional view taken along line 5-5 of FIG. 2, and which further depicts the ice dispenser 28, including the ice hopper 54 and the auger or agitator 56.

Figure 6:
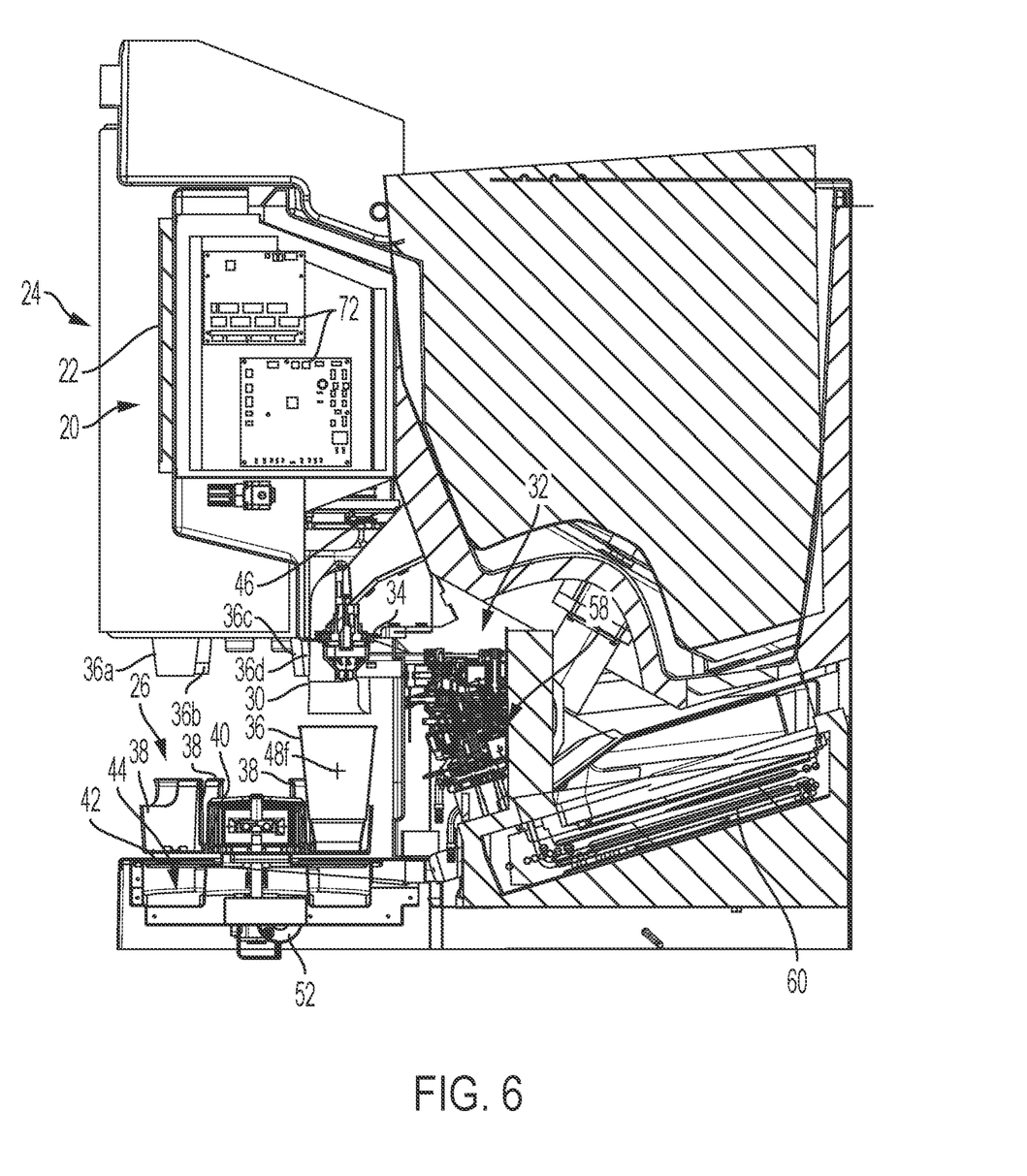
FIG. 6 is a sectional view taken along line 6-6 of FIG. 2.

The beverage dispensing machine 10 includes a beverage dispensing system 32, a nozzle 34 of which is shown. FIG. 6 is a cross-sectional view taken along line 6-6 of FIG. 2, and which further depicts the beverage dispensing system 32. The beverage dispensing system includes a plurality of fluid control valves 58 which are operated to control the flow of pre-mixed beverages or beverage constituents. Fluid control valves may be operated to selectively dispense concentrated flavoring and a diluent fluid (e.g. still or carbonated water)

from the nozzle 34 according to a drink order from a customer. The beverage dispensing system 32 further includes a cold plate 60, which is exemplarily cooled by the ice in the hopper 54. The fluids for the dispensed beverages are circulated through lines in the cold plate 60 to cool the fluids before dispensing.

Figure 3:
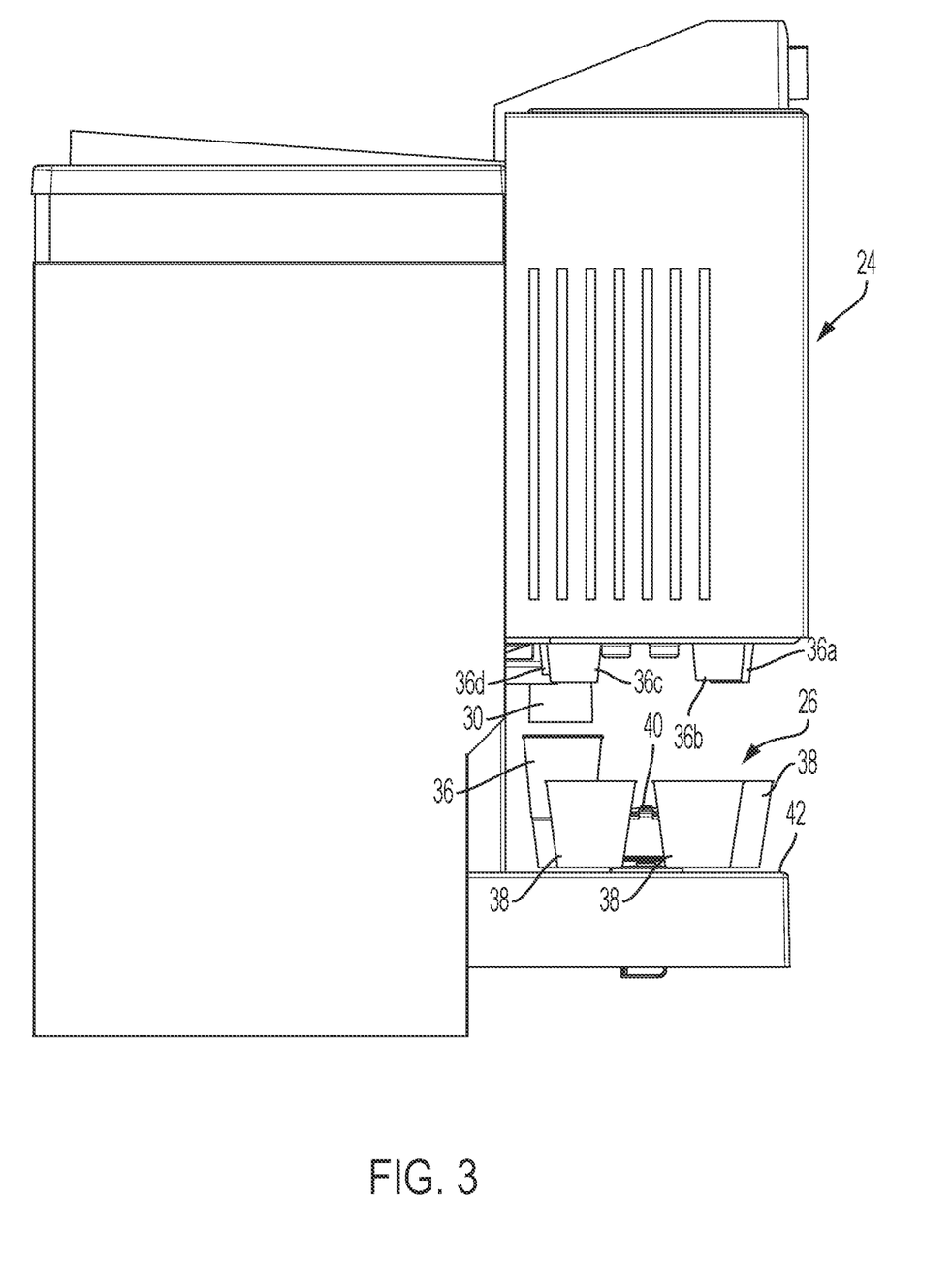
FIG. 3 is a side view of the beverage dispensing machine.

The cup dispenser 24 is configured to hold at least one if not more stacks of cups 36 in which the beverages are to be dispensed. In the example shown, the cup dispenser 24 includes four stacks 36a-36d of cups. Each of the stacks 36a-36d of cups may exemplarily be a different size, configured to hold a different volume of beverage. The stacks 36a-36d of cups may be arranged with one or more stacks positioned behind, or towards the back 14 of the beverage dispensing machine 10 from other stacks. Alternatively, the stacks 36a-36d may be arranged with one or more stacks positioned towards the front 12 of the beverage dispensing machine or towards the side 16, 18 of the beverage dispensing machine. That is, each of the stacks 36a-36d occupies a separate fixed location relative to the beverage dispensing machine. In the example depicted in FIG. 2, stack 36a of small cups and stack 36b of medium cups are positioned in front of stack 36c of large cups and stack 36d of extra-large cups. Likewise, stacks 36b and 36c are positioned towards the side 16 of the beverage dispensing machine from stacks 36a and 36d. As seen in FIG. 3, stack 36b is further positioned towards the back 14 of the beverage dispensing machine from the stack 36a and the stack 36c is positioned towards the front 12 from stack 36d and towards the back 14 from stack 36b. The cup dispenser 24 may include a selective release device 46 (see FIG. 6), for example the 674DC and Series 674AC adjustable plastic cup dispensers available from Componenti Vending S.p.A of Italy. The selective release devices may provide a screwing or twisting action to singulate a cup of a requested cup size from the supply stack. Still further details of an example of a selective release device are provided in U.S. Patent Application Publication No. 2020/0273283, which is incorporated herein by reference.

The cup carousel 26 further includes a plurality of cup holders 38 which are configured to receive a cup 36 therein. The cup holders 38 thus define the locations of any cups relative to the cup carousel 26. The cup carousel 26 may further include a conveyor belt 40 to which the cup holders 38 are secured. A shelf 42, for example with a drip tray 44 defined therein underlies the cup holders 38 and the cup carousel 26. The shelf 42 and drip tray 44 serves to catch spilled beverage, ice, or debris so as not to interfere with the operation of the cup carousel 26 and the beverage dispenser 10. Operation of a motor, exemplarily a servo motor, rotates the conveyor belt 40, along with the cup holders 38 secured thereto about an exterior of the cup carousel 26. The motor rotates the conveyor belt 40 to position the plurality of cup holders 38 at a plurality of successive indexed locations about the cup carousel 26.

Figure 4:
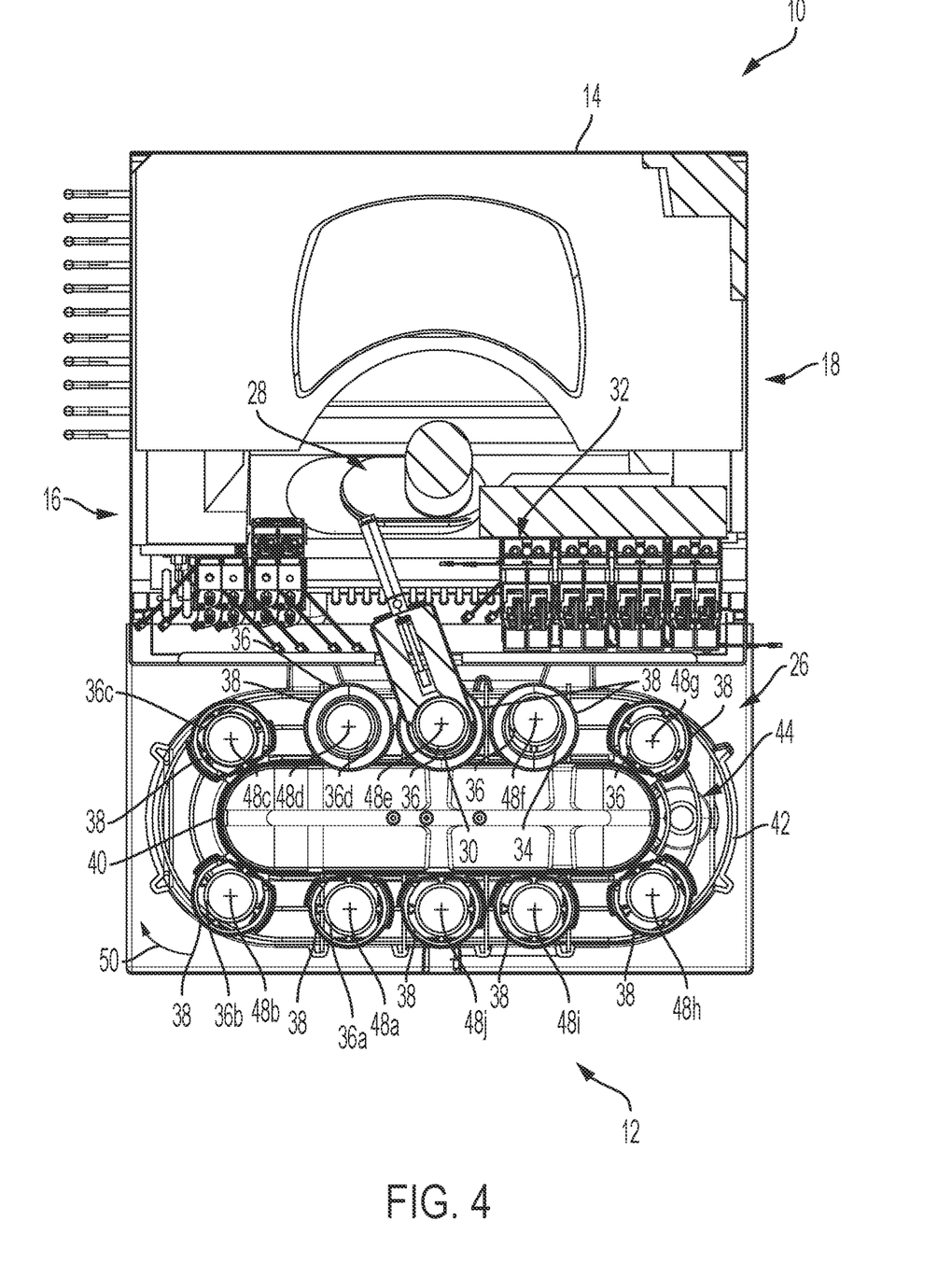
FIG. 4 is a sectional view taken along line 4-4 of FIG. 2.

FIGS. 3 and 4 further depict the cup carousel 26 as will be described herein. FIG. 3 is a side view of the beverage dispensing machine 10 and FIG. 4 is a sectional view of the beverage dispensing machine 10 taken along line 4-4 of FIG. 2. Referring to FIG. 4, the cup carousel 26 is depicted in a sectional view. The cup carousel 26 exemplarily includes ten cup holders. Each of the cup holders 38 are identified, e.g. cup holder #'s 1-10. As previously noted, the cup carousel 26 operates to move the cup holders 38 through a sequence of indexed locations. In the example of FIG. 4, the cup holders 38 are positioned at each of the indexed locations 48, and which will be further identified as indexed locations 48a-48j. The cup holders 38 may be secured to the conveyor belt 40 with a dovetail connection, while other types of releasable connections may also be used. The beverage dispensing machine 10 is for example calibrated such that the positions each of the cup holders is known, for example by initially locating cup holders 1-10 respectively at indexed locations 48a-48j. The conveyor belt 40 may be a silicone or rubber belt or may be formed of a plurality of articulated sections. In examples, flexibility or articulation in the conveyor belt 40 may provide a degree of lateral flexibility which facilitates conformity of the conveyor belt about the gears at either end of the cup carousel 26.

Indexed locations 48a-48d respectively coincide with the stacks 36a-36d of cups and therefore represent a plurality of cup loading locations. That is, a cup 36 dispensed from the selective release device 46 associated with stack 36a of cups will drop into cup holder 38 positioned at indexed location 48a. Indexed location 48e coincides with the ice dispensing chute 30 of the ice dispenser 28. Ice dispensed through the ice dispensing chute 30 will fall into a cup positioned at indexed location 48e. Indexed location 48f coincides with the nozzle 34 of the beverage dispensing system. A beverage dispensed through the nozzle 34 will fall into a cup positioned at indexed location 48f. Indexed locations 48g-48j respectively represent a plurality of staging locations of the plurality of indexed locations. Indexed locations 48g-48i are the indexed locations at which the cups of the dispensed beverages are held until the cups of the dispensed beverages can be removed for delivery to the customer.

Operation of the beverage dispensing machine 10 as described herein generally rotates the carousel 26 and the plurality of cup holders 38 in the direction of arrow 50 (exemplarily clockwise) relative to the indexed locations 48. The carousel increments the position of each cup holder 38 from one indexed location 48 to the subsequent indexed location 48 in the direction of arrow 50. Once the cup holders have incremented to the indexed locations 48. The beverage dispensing machine operates one or more of the selective release devices 46 of the cup dispenser to respectively release a small, medium, large, or extra-large cup into the cup holder at an associated indexed location 48. The beverage dispenser further operates to dispense ice from the ice dispenser 28 into a cup 36 in the cup holder 38 positioned at indexed location 48e and operates the beverage dispensing system 32 to dispense an ordered beverage through the nozzle into a cup 36 in the cup holder 38 positioned at indexed location 48e. In a still further example, a sensor may detect the presence, or rather, the absence of a cup in the cup holder 38 at indexed location 48j. The absence of a cup 36 in the cup holder 38 at indexed location 48j indicates that that cup holder is free to receive a cup for a future dispense therein from the cup dispenser 24.

Once these operations are performed, the beverage dispensing machine 10 operates to advance the cup holders 38 of the carousel 26 to the subsequent indexed location. With particular attention to indexed location 48f and indexed location 48g, it will be recognized that indexed location 48f is the beverage dispensing location. As the dispense of the beverage completes the process of automatedly dispensing an ordered beverage (e.g. dispensing a cup, dispensing ice, dispensing beverage), the indexed location 48g is the first staging location of the plurality of indexed locations. The indexed location 48g is exemplarily in a direction towards the side 18 of the beverage dispensing machine 10 and in a direction towards the front 12 of the beverage dispensing machine 10. That is, the first staging location of the plurality of indexed locations is moved to a location relative to the nozzle 34 that improves access by a worker to remove the cup from the cup holder 38. Therefore, a first staging location, at indexed location 48g of the plurality of indexed locations, after the beverage dispense location, at indexed location 48f of the plurality of indexed locations, that is both toward the side 18 and towards the front 12 of the beverage dispensing machine 10 from the beverage dispense location facilitates this access to the cup and removal of the cup from the beverage dispensing machine. This improved access to the beverage in the first increment after the beverage is dispensed improves beverage dispensing machine performance, particularly when the beverage dispensing machine is used during a time of low operational throughput, where the time between beverage dispense increments may be lower, or there may be a delay or lag between customer orders such that a preceding order does not "push" the current beverage orders through the beverage dispensing machine.

Figure 7:
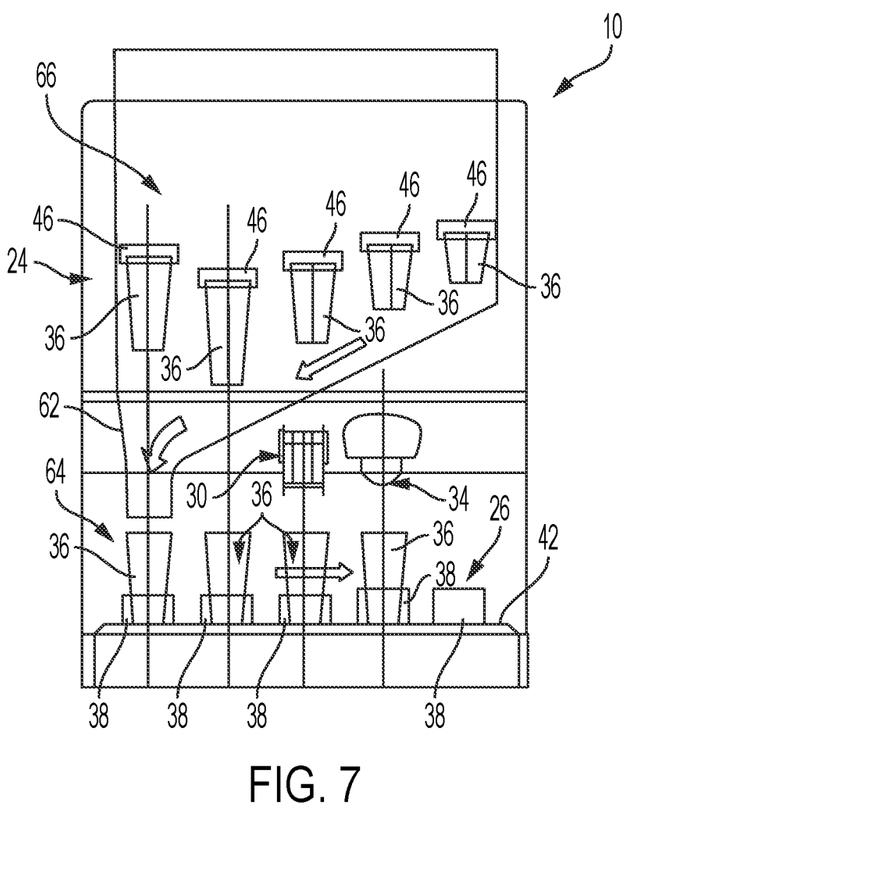
FIG. 7 is a front view of another example of a beverage dispensing machine.

FIG. 7 presents an example of the beverage dispensing machine 10. The beverage dispensing machine 10 in FIG. 7 includes a plurality of selective release devices 46, each associated with a stack of cups 36, for example, each of a different size. The selective release devices 46 operate to dispense a cup from the respective stack of cups to a specific loading location for that selective release device. A cup dispensing chute 62 receives each of the dispensed cups and directs the cups from their respective loading locations by a gravity feed to a dispense point 64 at one of the indexed locations. The cup dispensing chute 62 is arranged to the front 12 of the beverage dispensing machine 10 and the cup dispensing chute 62 thus moves each of the cups ins a direction, e.g. towards the side 16 of the beverage dispensing machine 10 to the dispense point 64. The positioning of the cup dispensing chute 62 across the front of the beverage dispensing machine when combined with a transparent or translucent front panel 66, or portions of the front panel of the dispensing chute, provides a visual indication to a user of the remaining cup supply within the cup dispensing chute 62. It will be recognized that in examples provided herein, the cup dispensing chute 62 and cup dispenser 24 may be secured to the beverage dispensing machine 10 by a hinged connection, such that the cup dispenser/dispensing chute can pivot open towards the user like a door to provide access both to the cup supplies stored therein as well as to the beverage/ice dispensers behind the dispensing chute for resupply or maintenance of the beverage/ice dispenser or the cup dispenser.

Figure 8:
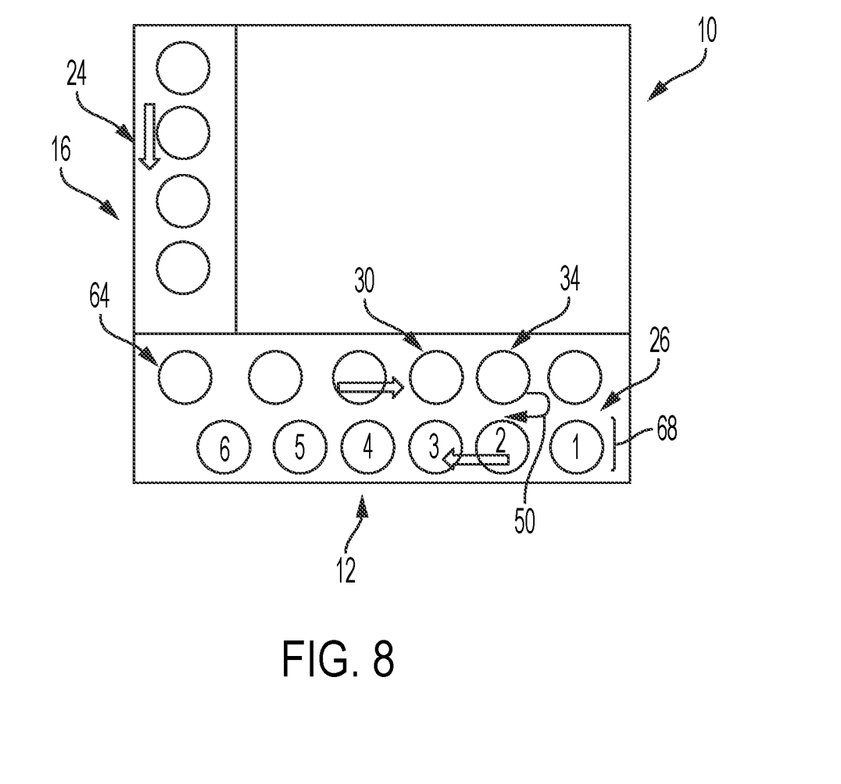
FIG. 8 is a plan view of a further example of a beverage dispensing machine.

FIG. 8 depicts a plan view of another example of a beverage dispensing machine 10. In FIG. 8 the cup dispenser 24 is arranged across a side 16 of the beverage dispenser 10. In an example wherein this side 16 of the beverage dispenser 10 is exposed, e.g. available for access or not obscured by a wall or other piece of kitchen equipment, this side panel could be made transparent or translucent such that a user can visually observe the supply of cups held within and notice if the cup supply needs replenishing. When a particular size cup is requested, the cup dispensing system, which may operate as described above, operates to release a single cup of the requested size from the stack. In an example, the cup dispenser 24 may operate in the manner as described above with respect to FIGS. 1-6 to dispense the cups individual cup loading locations. Once dispensed at each of the cup loading locations, the dispensed cups are moved towards the front 12 of the beverage dispensing machine, for example by a conveyor or linear actuator from which the dispensed cups are directed to the ice dispense location 30 and the beverage dispense location 34, for example by the carousel 26. In other examples, the cup dispenser 24 may operate as described above with respect to FIG. 7, although arranged along the side of the beverage dispensing machine 10. Each selective release device 46 operates to dispense the cup at a different loading location while the chute 62 directs the dispensed cups by a gravity feed to the cup dispense point 64. In a further example, a linear actuator, which for example includes arms, fingers, or other grippers is operable to be positioned below each of the stacks to receive the dispensed cup. The linear actuator moves the selected cup forward to the cup dispense point 64. In still further examples, a horizontal conveyor may be used to bring the released cup from each of the cup loading locations associated with the selective release devices forward to the dispense point 64. Once at the dispense point 64, a carousel 26 or other combination of linear actuators and/or horizontal conveyor belts may move the cups about the beverage dispenser 10 in the direction of arrow 50. In the example depicted in FIG. 8, with the dispense point 64 located at a single position, all of the indexed locations across the front 12 of the beverage dispensing machine 10 may be used as staging locations 68.

Figure 9:
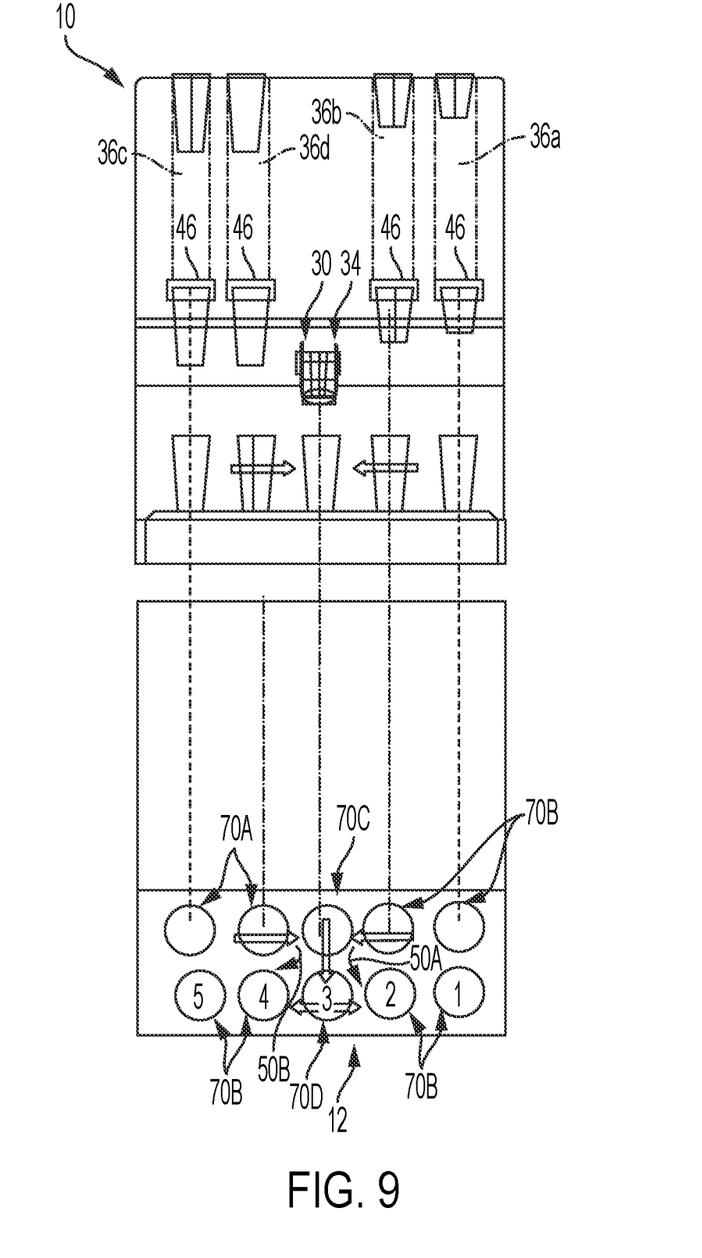
FIG. 9 is a plan view of a still further example of a beverage dispensing machine.

FIG. 9 is a plan view of another example of a beverage dispensing machine 10 with a front-facing linear cup dispenser 24. The beverage dispensing machine 10 provides co-locates the ice dispenser 28 and the beverage dispenser 32 to a single dispense point. The cup dispenser 24 divides the stacks of cups 36a-36d to either side of the co-located ice dispenser 28 and beverage dispenser 32. The beverage dispensing machine 10 operates to cycle dispensed cups in two sub-systems along arrows 50A and 50B. The sub-systems each have two cup loading locations 70A and two staging locations 70B with a common dispense location 70C and a common initial staging location 70D. In this example, the movement of the cup from the common dispense location 70C to the common initial staging location 70D is a movement directly towards the front 12 of the beverage dispensing machine 10 to facilitate retrieval of the dispensed beverage. This arrangement further presents the staging locations across the front 12 of the beverage dispensing machine, to facilitate access to the dispensed beverages. The movement of the cups within this arrangement may exemplarily be performed with two carousels as described above, with one carousel for each sub-system of the dispensing machine. In other examples, linear actuators and/or horizontal conveyors, or a combination thereof may be used. As with other examples, cup carriers and an electro-magnetic translation system could be used to move the cups about the beverage dispensing machine.

FIG. 10 presents a plan view of a still further example of an arrangement of the beverage dispensing machine 10. In the arrangement of FIG. 10, the cup carousel 26 is exemplarily circular rather than ovate. The cup carousel 26 includes a single cup dispense point 64 but includes separate locations for the ice dispensing system 28 and the beverage dispensing system 32. The circular cup carousel 26 increased the distance that the dispensed beverages are brought forward to towards the front 12 of the beverage dispensing machine 10 relative to the rest of the machine, further improving user access to the dispensed beverages in the staging locations. As the dispensed beverages are rotated in the direction of arrow 50, the cup filled with a dispensed beverage is moved both in the directions towards the front 12 and to the side 18 of the beverage dispensing machine 10 from the fill location 70C to the initial staging location 70D. In a still further example, the carousel 26 may also include a lid staging area 78 which stores the lids for the beverages centrally to the staged dispensed beverages. In other examples, a labeling device may be positioned at the location of the lid staging area 78, and which operates to affix a label to each of the beverage cups indicating the contents of the cup and an identification of an associated customer order.

FIG. 11 is a system diagram of a beverage dispensing machine 10 as has been described herein. The beverage dispensing machine 10 includes a computer 72 which receives inputs from components depicted in FIG. 11 and produces outputs and control signals to the components depicted therein such as to carry out the functions of the beverage dispensing machine 10 as described herein. The computer 72 is exemplarily a single board computer (SBC) which includes a microprocessor and associated computing components for e.g. power management, communication, and/or memory. The computer 72 executes computer readable code stored in a non-transient computer readable medium, causing the computer 72 to carry out the functions as described herein.

The computer 72 is configured to receive user inputs, including, but not limited to various orders of beverages to be dispensed. The order exemplarily includes both a beverage size (e.g. volume) and a type (e.g. premixed beverage or selection of flavoring and diluent). The beverage dispensing machine 10 may operate to receive an order input through a user interface 22 presented on a graphical display 20. The computer 72 may be communicatively connected to the graphical display 20 to provide the graphical display 20 with instructions to operate to visually present the user interface 22 thereon. The graphical display 20 may further be a touch-sensitive graphical display operable to receive one or more user inputs of the beverage order and communicate those user inputs to the computer 72. In a still further example, the computer 72 is communicatively connected to a point of sale (POS) system 74 into which customer orders are received and processed for fulfillment. A restaurant may include communication kiosks operable by either a customer or by a restaurant employee to enter the customer order into the POS system. In still further examples, the POS system may operate to receive customer orders placed through an online order system. While examples of such communication is provided in the present disclosure, including, but not limited to that provided in U.S. Pat. No. 10,689,240 and U.S. Patent Application Publication No. 2020/0273283, it will be recognized that other manners of communication of customer beverage orders into the beverage dispensing machine may be used. Once such orders are received by the POS system 74, the orders are communicated to the computer 72 and the beverage dispensing machine 10 may operate as disclosed to automatedly fulfill the received customer orders.

As previously described, the beverage dispensing system 10 operates to provide a series of indexed locations and operates to advance the cup holders through this plurality of indexed locations to automate the beverage dispensing process. The computer 72 receives a signal from a sensor 76 indicating that the cup holder at the last staging location of the plurality of indexed locations is clear of a cup. The beverage dispensing system 10 is then ready to dispense a cup for a subsequent beverage order into this cup holder. The computer 72 provides an instruction to the motor 52 to advance the carousel 26 one increment to move each of the cup holders from the indexed location in which the cup holder is currently located to a next subsequent indexed location of the plurality of indexed locations. The computer 72 maintains a record at a memory at a computer readable medium of, for example, the location of each identified cup holder, the current indexed location of the cup holder, and the status of the cup holder/dispensed beverage in the cup holder. Continuing the example presented above with respect to FIG. 4, the computer would exemplarily hold a record that cup holder #1 (or cup location #1) is currently empty and has advanced to the first cup loading location of the plurality of indexed locations (e.g. 48a). For the simplicity of explanation, this single cup holder/cup location will be described herein, although similar records are maintained by the computer 72 and similar corresponding operations occur for each of the cup holders/cup locations.

As previously described, the cup dispenser 24 may operate to dispense each of a plurality of differently sized cups at each of a plurality of cup dispensing locations. Continuing the example, if the customer order specifies a "small" cup size, exemplarily associated with indexed location 48a, then the cup dispenser 24 is operated by a control signal from the computer 72 to dispense a single small cup into the cup holder #1. The controller updates the associated record accordingly to note that an empty cup is in cup holder #1. If the customer order instead specifies another size of cup, then the cup dispenser 24 is operated to not release a cup until the cup holder #1 reaches the associated loading location. The computer 72 updates the records for each of the cup holders/cup locations with each operation to advance the plurality of cup holders/cup locations to the subsequent indexed locations.

The motor 52 is operated to advance the plurality of cup holders/cup locations through the subsequent indexed locations. When cup holder/cup location #1 is advanced to the ice dispense location (e.g. indexed location 48e), the computer 72, noting that the customer order associated with cup holder/cup location #1 is a "small" size (e.g. volume) beverage that requires ice, provides instructional communications to the ice dispenser 28 to dispense a "small" size quantity of ice. The computer 72 updates the record for cup holder/cup location #1 to reflect a small cup filled with ice at indexed location 48e.

The motor 52 is next operated by the computer 72 to advance the plurality of cup holders/cup locations to the subsequent indexed location (e.g. cup holder/cup location #1 to indexed location 480 which is the beverage dispense location, associated with the beverage dispenser 32. The computer 72, noting that the customer order associated with cup holder/cup location #1 is a "small" size cola beverage, provides instructional communications to the beverage dispensing system 32 to operated the associated valves to dispense either a pre-mixed cola or the constituent components of a cola beverage in the volume associated with a "small" size. The computer 72 updates the record for cup holder/cup location #1 to reflect a small cup filled with ice and cola at indexed location 48f.

The motor 52 is next operated by the computer 72 to advance the plurality of cup holders/cup locations to the subsequent indexed location (e.g. cup holder/cup location #1 to indexed location 48g) which is the first staging location. While at any one of the plurality of staging locations, the dispensed beverage may be removed for delivery to the customer. However, the plurality of staging locations, provide the ability to aggregate dispensed beverages into a single customer order and removal from the beverage dispensing machine at one time (e.g. in quick succession of each other). As the beverage dispensing machine 10 operates to automatedly dispense further customer-ordered beverages, the motor 52 is operated by the computer 72 to advance the plurality of cup holders/cup locations to the subsequent indexed location (e.g. cup holder/cup location #1 to indexed location 48*h*, then 48*i*, then 48*j*). As noted above, if the cup at cup holder/cup location #1 is not removed by the time that cup holder/cup location #1 reaches indexed location 48*j*, then the sensor 76 will provide a signal to the computer 72 to hold on any further operations to the motor 52, advancing the cup holders/cup locations to any subsequent indexed locations until cup holder/cup location #1 is clear and ready to receive a new cup for a subsequent customer order.

In examples of beverage dispensing machines communicatively connected to a point of sale system. Such beverage dispensing machines may further operate to label the cups with a corresponding indication of the beverage dispensed therein. Examples of the beverage dispensing machine as described herein may further incorporate a labeling machine. In an example, the labeling machine prints a label for each cup, for example with a visual indication of the beverage dispensed therein, of an order reference number, a customer name, or other order information. The labeling machine may be positioned along the path of the cup through the beverage dispensing machine. The labeling machine may be positioned for example between the loading position and the ice dispense position, between the ice dispense position and the beverage dispense position, or between the beverage dispense position and the first staging position. The labeling machine may have the label partially extend out of the machine, such that the cup contacts the label as the cup is moved past the labeling machine and the label adheres to the cup by adhesive. On the label.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification. It is recognized that the examples provided herein as well as in the references incorporated by reference are examples of the disclosure and that still further combinations of the features of these individual disclosures are recognized to be made and are considered to be within the scope of the present disclosure.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An automated beverage dispensing system having a front and a back and a first side opposite a second side, the automated beverage dispensing system further comprising:

a conveyance system comprising a plurality of cup holders, the plurality of cup holders including a first cup holder, a second cup holder, and a third cup holder, and operates to incrementally and sequentially move the plurality of cup holders through a plurality of sequential indexed locations, the plurality of sequential indexed locations comprising at least five indexed locations arranged on each of a frontal and a rearward side of a horizontal axis of the conveyance system, and wherein the sequential indexed locations are generally parallel to the horizontal axis and share a common generally horizontal line, and the plurality of sequential indexed locations includes a first cup loading location, a second cup loading location, and a third cup loading location;

a cup dispensing system configured to receive a first supply of cups positioned at the first cup loading location, a second supply of cups positioned at the second cup loading location, and a third supply of cups positioned at the third cup loading location, the cup dispensing system operable to dispense a first cup from the first supply of cups to the first cup holder at the first cup loading location, to dispense a second cup from the second supply of cups to the second cup holder at a second cup loading location, and to dispense a third cup from the third supply of cups to the third cup holder at the third cup loading location, before the conveyance system advances the plurality of cup holders to a subsequent location of the plurality of sequential indexed locations, wherein the first cup loading location is located on the rearward side of the horizontal axis and is offset from the second cup loading location in a direction towards a second side of the automated beverage dispensing system, wherein the second cup loading location is located on the rearward side of the horizontal axis and is offset from the first cup loading location in a direction towards a first side and towards the front of the automated beverage dispensing system, and wherein the third cup loading location is located on the frontal side of the horizontal axis and is offset from the second cup loading location in the direction towards the front of the automated beverage dispensing system, wherein the first and second cup loading locations are separated from the third cup loading location by the horizontal axis of the conveyance system;

a beverage dispensing system configured to dispense a beverage at a beverage dispense location of the plurality of indexed locations; and a computer that associates a first ordered beverage to the first cup holder and a second ordered beverage to the second cup holder and maintains a record of a status of the first cup holder and the second cup holder and updates the record of the status when the conveyance system advances the plurality of cup holders to the subsequent location of the plurality of sequential indexed locations.

2. The automated beverage dispensing system of claim 1, wherein the conveyance system defines a first staging location, the plurality of indexed locations comprising the first staging location, wherein the first staging location is subsequent to the beverage dispense location within the plurality of indexed locations to which the plurality of cup holders are sequentially moved.

3. The automated beverage dispensing system of claim 2, wherein the first staging location is offset from the beverage dispense location in a direction towards the second side of the automated beverage dispensing system and towards the front of the automated beverage dispensing system.

4. The automated beverage dispensing system of claim 3, wherein the conveyance system comprises a second staging location of the plurality of indexed locations, the second staging location is subsequent to the first staging location and offset from the first staging location in a direction towards the front of the automated beverage dispensing system.

5. The automated beverage dispensing system of claim 2, wherein each of the plurality of cup holders is configured to receive a cup therein and wherein operation of the conveyance system moves the plurality of cup holders and any cup received therein sequentially through the plurality of indexed locations.

6. The automated beverage dispensing system of claim 1, further comprising:
a fourth cup loading location and the cup dispensing system is configured to position a fourth supply of cups at the fourth cup loading location of the plurality of indexed locations, the fourth cup loading location is further offset from the third cup loading location in a direction towards the front and towards the second side, and the fourth cup loading location is located on the frontal side of the horizontal axis of the conveyance system.

7. The automated beverage dispensing system of claim 6, further comprising an ice dispensing system, the ice dispensing system comprising a hopper and a chute, the ice dispensing system configured to dispense ice into a cup at an ice dispensing location that coincides with an ice dispense location of the plurality of indexed locations.

8. The automated beverage dispensing system of claim 7, wherein the beverage dispense location is immediately successive to the ice dispense location in the plurality of indexed locations.

9. The automated beverage dispensing system of claim 6, wherein the cup dispensing system is configured to dispense a third cup from the third supply of cups to a third cup holder of the plurality of cup holders at the third cup loading location and a fourth cup from the fourth supply of cups to a fourth cup holder of the plurality of cup holders at the fourth cup loading location before the conveyance system advances the plurality of cup holders to a subsequent location of the plurality of sequential indexed locations.

10. The automated beverage dispensing system of claim 1, wherein the first supply of cups comprises cups of a first size and the second supply of cups comprises cups of a second size, with the first size being different from the second size.

11. The automated beverage dispensing system of claim 1, wherein the conveyance system defines a first staging location at an indexed location of the plurality of indexed locations immediately subsequent to the beverage dispense location within the plurality of indexed locations;
wherein the conveyance system defines a second staging location at an indexed location of the plurality of indexed locations immediately subsequent to the first staging location within the plurality of indexed locations; and
wherein the first staging location is offset from the beverage dispense location in a direction towards the second side of the automated beverage dispensing system and towards the front of the automated beverage dispensing system and the second staging location is offset from the first staging location in a direction towards the front of the automated beverage dispensing system.

12. The automated beverage dispensing system of claim 1, further comprising:
a graphical user interface communicatively connected to the computer and located in the direction towards the front from the beverage dispense location, and wherein at least a portion of the cup dispensing system extends in a direction towards the front beyond the graphical user interface.

\* \* \* \* \*